United States Patent
Farrell et al.

(10) Patent No.: US 10,896,235 B2
(45) Date of Patent: Jan. 19, 2021

(54) CONNECTING A PRINTED DOCUMENT TO RELATED DIGITAL CONTENT

(71) Applicant: Tyndale House Publishers, Inc., Carol Stream, IL (US)

(72) Inventors: Daniel Farrell, Wheaton, IL (US); Keith Williams, Grand Haven, MI (US)

(73) Assignee: Tyndale House Publishers, Inc., Carol Stream, IL (US)

( * ) Notice: Subject to any disclaimer, the term of this patent is extended or adjusted under 35 U.S.C. 154(b) by 34 days.

(21) Appl. No.: 16/507,258

(22) Filed: Jul. 10, 2019

(65) Prior Publication Data

US 2020/0019575 A1 Jan. 16, 2020

Related U.S. Application Data

(60) Provisional application No. 62/697,546, filed on Jul. 13, 2018.

(51) Int. Cl.
| | |
|---|---|
| *G06F 16/955* | (2019.01) |
| *G06F 3/14* | (2006.01) |
| *G06K 9/32* | (2006.01) |
| *G06K 9/00* | (2006.01) |
| *G06F 3/0481* | (2013.01) |
| *G06F 16/583* | (2019.01) |
| *G06F 16/51* | (2019.01) |
| *G06F 16/9538* | (2019.01) |
| *G06K 9/03* | (2006.01) |

(52) U.S. Cl.
CPC ........ *G06F 16/955* (2019.01); *G06F 3/04817* (2013.01); *G06F 3/14* (2013.01); *G06F 16/51* (2019.01); *G06F 16/5846* (2019.01); *G06F 16/9538* (2019.01); *G06K 9/00469* (2013.01); *G06K 9/03* (2013.01); *G06K 9/3216* (2013.01); *G06F 2203/04803* (2013.01)

(58) Field of Classification Search
CPC ...................................................... G06F 16/955
See application file for complete search history.

(56) References Cited

U.S. PATENT DOCUMENTS

| | | | |
|---|---|---|---|
| 7,831,912 B2 | 11/2010 | King et al. | |
| 8,621,349 B2 | 12/2013 | King et al. | |
| (Continued) | | | |

OTHER PUBLICATIONS

Weibel et al.,"A Model for Mapping between Printed and Digital Document Instances", 2007, ACM, pp. 19-28.*
(Continued)

*Primary Examiner* — James J Debrow
(74) *Attorney, Agent, or Firm* — Banner & Witcoff, Ltd.

(57) ABSTRACT

Aspects described herein relate to a computer device connecting a physical printed document to relevant contextual digital content through a visual capture of one or more sequential ordering systems in the printed document. When the computer device detects when a screen icon is aligned with a printed icon on the printed document, the computer device analyzes visual input from its scanning device to identify both the document and the page/section number being scanned and subsequently delivers relevant, contextual digital content to provide an extended experience of the printed document through supplemental textual, visual, and/or audio content presented on the computer device.

20 Claims, 8 Drawing Sheets

(56) References Cited

U.S. PATENT DOCUMENTS

| | | | |
|---|---|---|---|
| 8,887,044 B1 | 11/2014 | Goodspeed et al. | |
| 2005/0025348 A1* | 2/2005 | Tecu et al. | G06K 9/00 |
| 2005/0178839 A1 | 8/2005 | Grant | |
| 2007/0047782 A1 | 3/2007 | Hull et al. | |
| 2014/0181155 A1* | 6/2014 | Homsany | G06F 17/3028 |
| 2015/0296092 A1* | 10/2015 | Jeong | H04N 1/00238 |
| 2016/0117487 A1 | 4/2016 | Amacker et al. | |

OTHER PUBLICATIONS

Oct. 9, 2019—(WO) International Search Report and Written Opinion—App PCT/US2019/041387.

* cited by examiner

000
CONNECTING A PRINTED DOCUMENT TO RELATED DIGITAL CONTENT

This patent application claims priority to U.S. provisional patent application Ser. No. 62/697,546 entitled "Publishing Technology for Connecting a Printed Document to Related Digital Content" filed on Jul. 13, 2018, which is hereby incorporated by reference in its entirety.

TECHNICAL FIELD

One or more aspects of the disclosure generally relate to a computer device connecting a printed document to related digital content through visual capture and analysis.

BACKGROUND

Traditional publishing may be directed to ways that utilize technology to provide readers with an enhanced experience with paper books, for example, adding digital media discs and supporting advanced e-reader platforms. Typically, traditional approaches are focused on ways to use digital tools to deliver the text of books in a way that enhances functionality through electronic delivery. For instance, digitally-tagged text allows for searching, connection to dictionary programs, electronic note-taking, and so forth. Several e-reading technologies offer all of these functions, but in the majority of cases, they simply replace the paper book with a digital version with added functionality. Some attempts integrate digital interactivity within the confines of a printed book, primarily through the use of encoded data structures (for example, bar codes or QR codes) that allow a digital device to launch a specific Internet address in order to access content or to perform very specific actions. All of these traditional technologies either discard the printed book as unnecessary or mar the pages with interruptive codes that need to be scanned to provide enhanced digital content. Alternatively, some traditional technologies actively scan the text on the printed page and use sophisticated and resource-intensive software solutions to recognize the text being scanned in order to provide added value (for example, instant translations into other languages through Google Translate). While this approach may not interrupt the printed page in any way, it is extremely resource intensive and limits the utility of the approach to environments that have Internet accessibility and devices capable of devoting significant processing resources to the task. Additionally, it may be a difficult and cumbersome task to identify the specific range of text that is intended by the user in order to provide the expected additional content beyond the printed page.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A process connects a printed document to related digital content through visual capture and analysis of one or more sequential ordering systems in the printed document. The process involves a technique of designing the printed page of a specific document to have no visual indication to the reader that there is any differentiation between this printed document and any other. The only distinctive feature is a simple unique character printed near the page number of the printed document, having the appearance of a simple aesthetic design element. The process may also interact with a software application that utilizes visual capture from the camera on a digital device (for example, a mobile phone or tablet computer) in order to quickly and accurately recognize the specific page being viewed and then deliver curated, relevant, and context-sensitive digital content to the user on the user's digital device.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

With an aspect of the embodiments, a digital solution enhances a print publication without introducing interruptive elements on the page or requiring Internet access and significant processing resources and also preserves the simplicity and integrity of the native sections of a printed document (for example, page breaks, chapters, and marked subsections).

Figure 1:
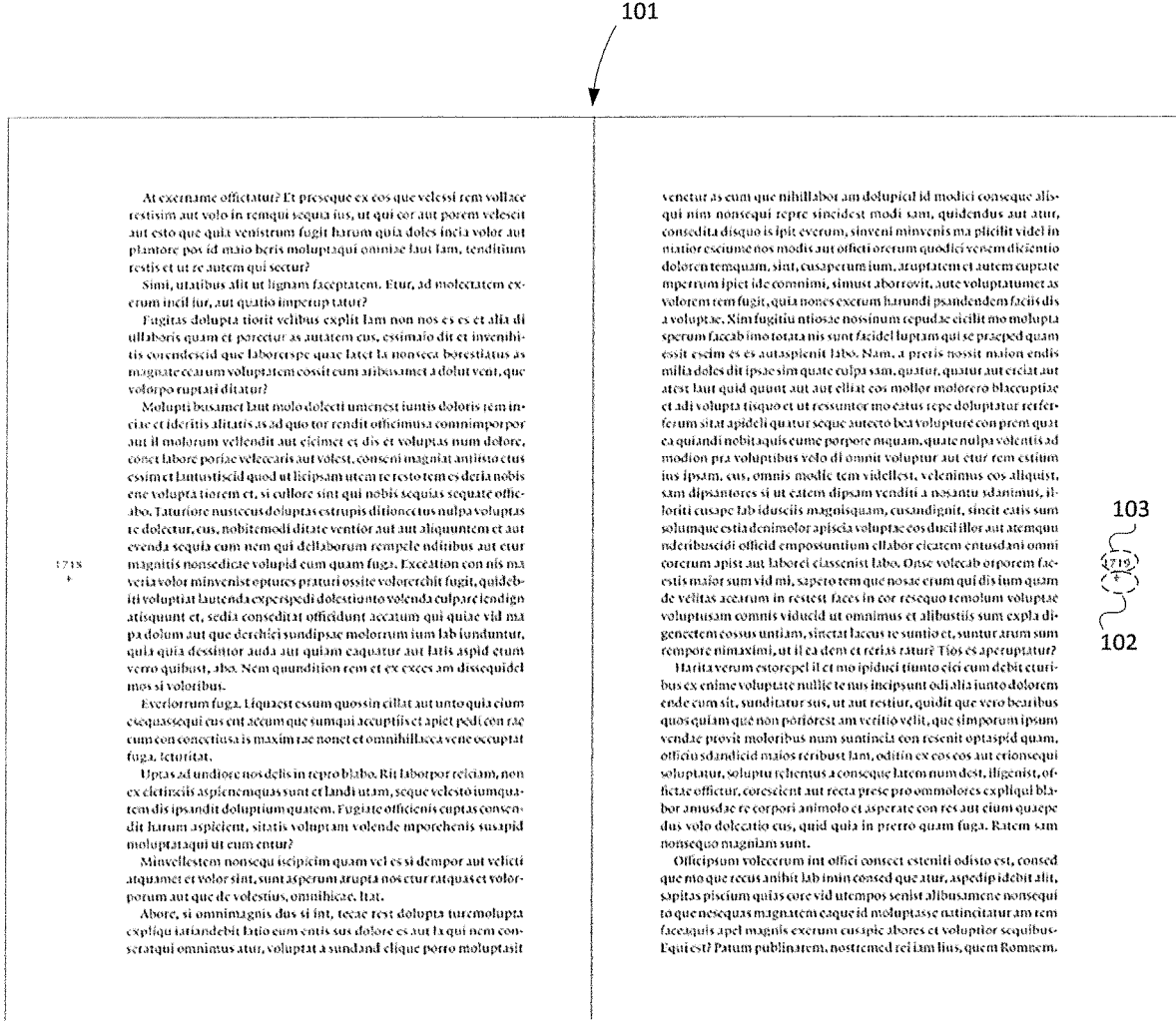
FIG. 1 illustrates a generic page design with a visible special character in accordance with one or more example embodiments.

FIG. 1 illustrates a generic page design with visible special character (icon) 102 in accordance with one or more example embodiments.

Figure 7:
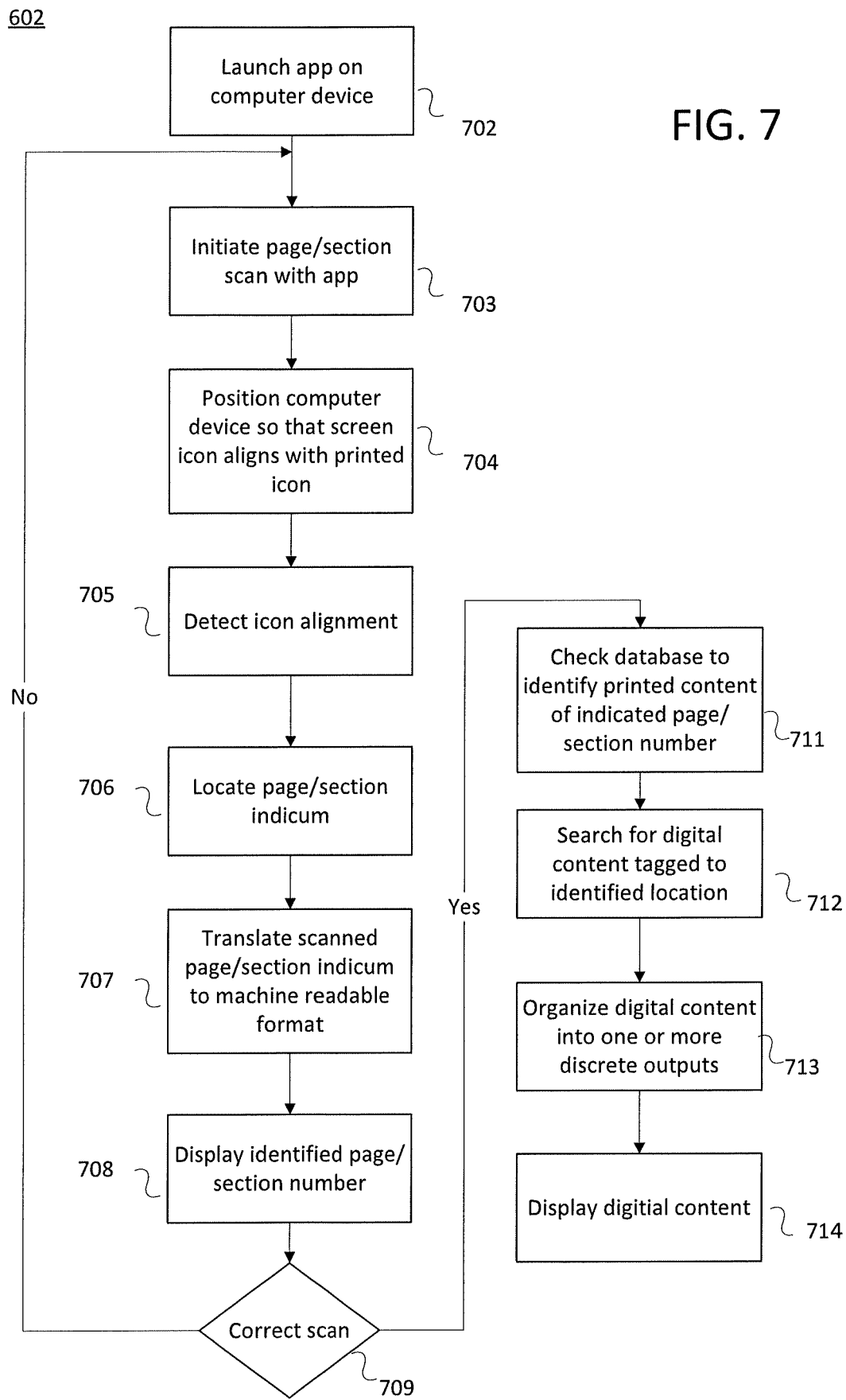
FIG. 7 illustrates a flow chart for the process shown in FIG. 6 in accordance with one or more example embodiments.

With an aspect of the embodiments, a process (for example, process 602 as shown in FIG. 7 that will discussed in further detail) connects printed document 101 (for example, a published book) to related digital content through a digital device that visually captures and analyzes one or more sequential ordering schemes in printed document 101. This approach may be applied to any printed document that utilizes a scheme for organizing content sequentially with a printed number system, so long as the printed document can accommodate the presence of special (identifying) character 102 in the vicinity of the page/section indicium 103 designating a page/section number. Moreover, embodiments may additionally support a different type of image or icon (for example, emoji) other than a special character that are distinctive from the printed content of printed document 101.

With some embodiments, a process (method) may be used to connect a printed Bible with related content delivered through a software application developed for smartphones and tablet computers.

Some embodiments may not relate specifically to a Bible, but instead may relate to a fiction book, where the author or a knowledgeable editor may provide a dataset of extended content related to particular pages or chapters of their book (for example, maps of fictional towns, unpublished background information on characters that appear on that page, behind-the-scenes information about the writing process, and so forth). Additionally, a method of connecting to specific section numbers may be useful in textbooks that are used in a learning environment, allowing publishers to provide interactive quizzes connected to a specific section of the textbook through a digital device that supports the method.

Embodiments may also support an auto repair manual that uses the method to connect videos demonstrating techniques and steps associated with each specific section in the manual.

With an aspect of the embodiments, printed documents are maintained with the specific features they already have, where well-designed pages are interacted with on their own, without distraction. This approach utilizes universally recognized sequential numbering schemes that are already present in well-designed printed documents (for example, page numbers and/or section numbers). Consequently, associated digital content may be modified, added, or removed without disrupting/affecting the appearance of the printed document. With this approach, delivery of valuable, extended digital content for the specified locations may be supported, thus providing a user with an experience that differs from, and is in many ways better than, the experiences available in traditional approaches.

Figure 2:
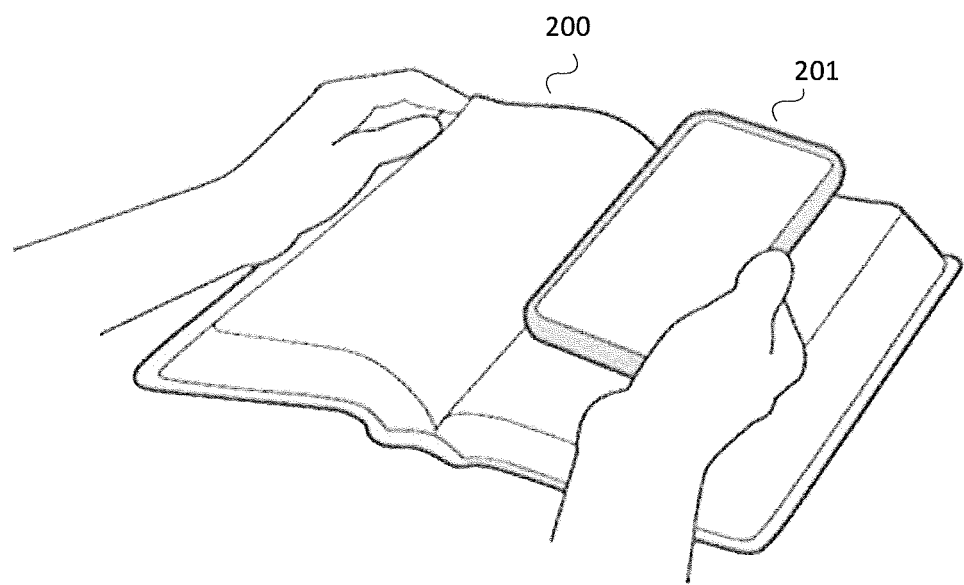
FIG. 2 illustrates a user positioning a smartphone or tablet over a printed book in accordance with one or more example embodiments.

FIG. 2 illustrates a user positioning a smartphone or tablet 201 over printed book 200 in accordance with one or more example embodiments.

Figure 3:
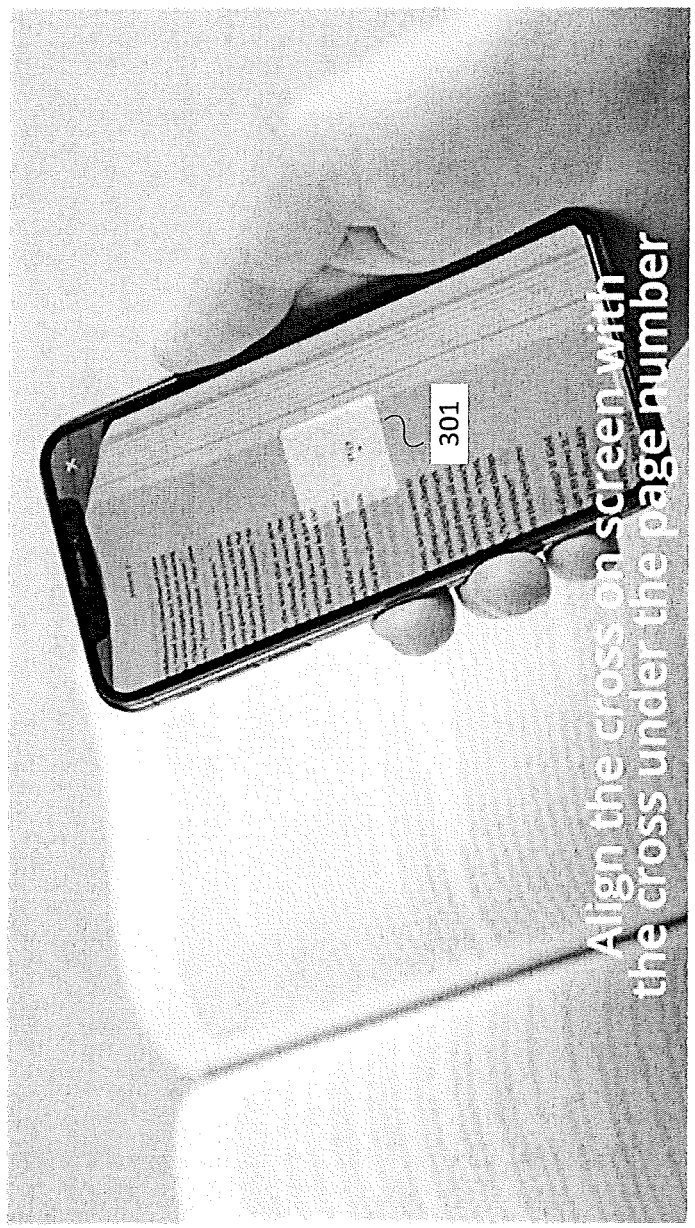
FIG. 3 illustrates a screen shot provided by a camera capture process in accordance with one or more example embodiments.
Figure 5:
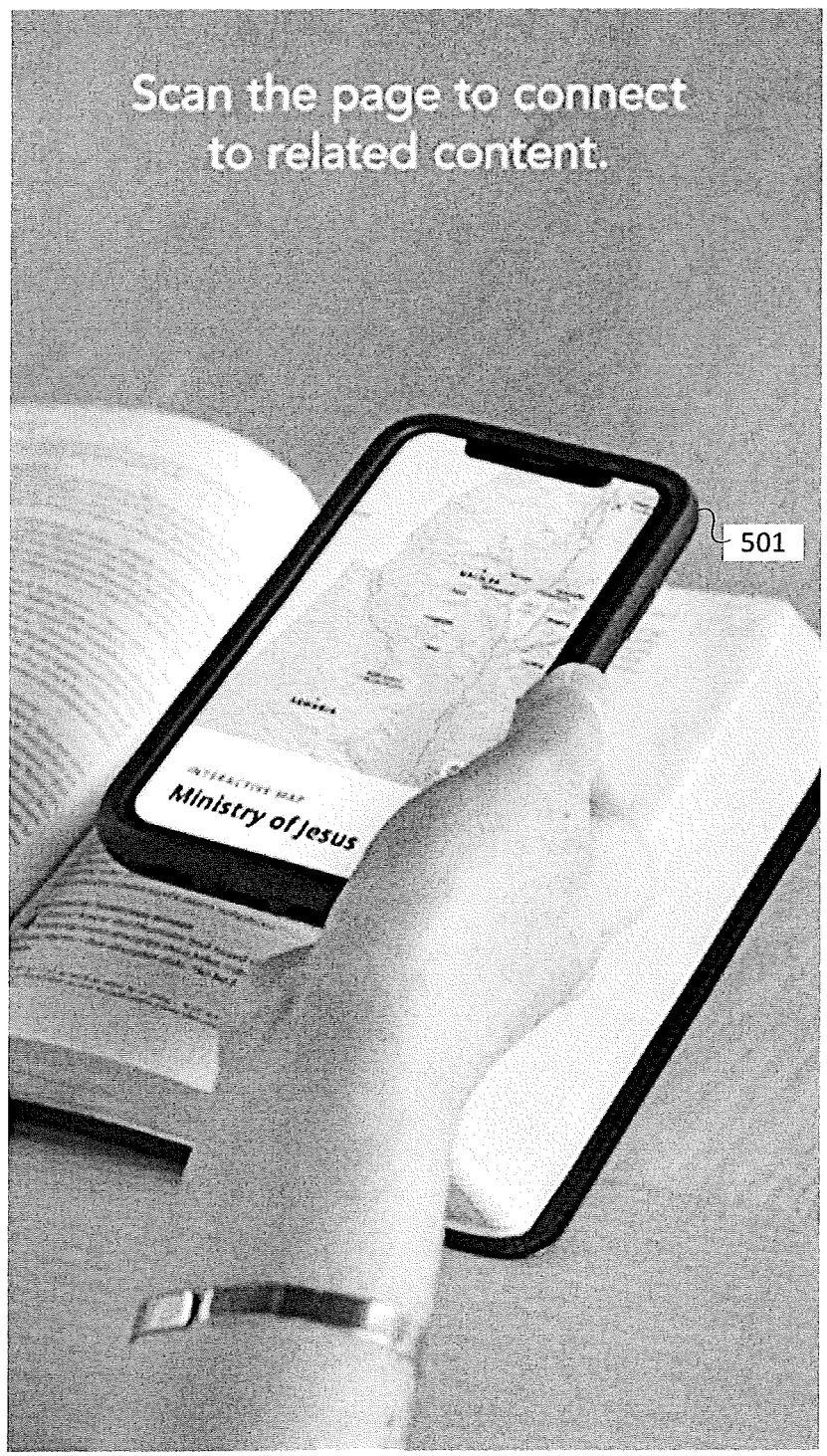
FIG. 5 illustrates a screen shot of an exemplary digital content delivery in accordance with one or more example embodiments.

With an aspect of the embodiments, an approach relies on two separate but interconnected pieces: (1) printed document 200 with a page-design element (for example, page/section indicium 103 and printed icon 102 as shown in FIG. 1) to identify locations and (2) mobile computing device 201 (for example, a smartphone or tablet computer executing a software app) designed to recognize the specific location within the printed document that is being viewed through the device's camera (for example as shown in FIG. 3). A software application may then deliver relevant digital content that extends, amplifies, and/or elucidates the content of printed document 200 (for example, as shown in FIG. 5).

FIG. 3 illustrates a screen shot provided by a camera capture process in accordance with one or more example embodiments.

As previously discussed, FIG. 1 shows an example of a basic page design of printed document 101. The approach does not rely on any unsightly sets of dot code or anything that interrupts the flow of reading a well-designed print publication. Consequently, the approach preserves a reading experience of the published work for times when the reader does not desire additional content from a digital device to extend their experience. With this approach, a user (reader) has the option to engage with the text on its own, without the intrusion of unwanted extras or unsightly QR codes. This aspect is distinctive of traditional approaches, which often rely on machine-readable codes for digital devices to read but are typically disruptive to a pleasurable reading experience for human eyes.

FIG. 2, as previously discussed, shows the basic interaction between a digital device (in this case, a smartphone) and the printed document.

Referring back to FIG. 3, a visual capture that links a digital device to the printed document. Region 301, which is expanded in FIG. 4, includes printed icon 402 (shown as a cross symbol in FIGS. 3 and 4) beneath page indicium 401 (which designates the page number). Printed icon 402 may be a unique character that the software application recognizes.

Figure 4:
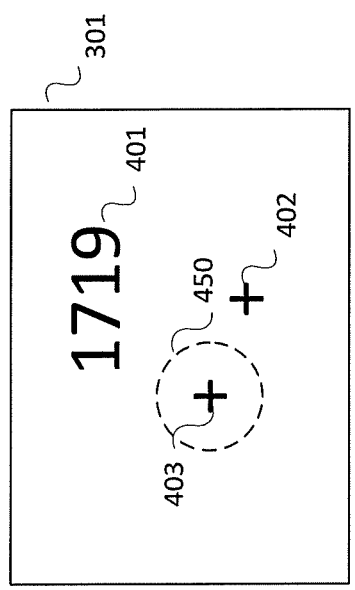
FIG. 4 illustrates a region of the screen shot shown in FIG. 3 when aligning a printed icon with a screen icon in accordance with one or more example embodiments.

With the example shown in FIGS. 3 and 4, the cross symbol specifying printed icon 402 identifies the particular printed document in view (in this example, a particular typesetting of the New Living Translation® of the Bible). The software application then recognizes (detects) page indicium 401 directly above the cross symbol, extracts the page number from page indicium 401, checks a database embedded in the software application to identify the specific content visible on that page (for example, a range of Book Chapter:Verse locations in that particular Bible), and fetches digital content from a location-tagged database of related content for that page.

In order to properly locate page indium 401, the user aligns printed icon 402 with screen icon 403, which is generated by the software application. The user may be directed to align the special character (printed icon 402) near page indicium 401 or other sequentially-numbered location indicator on the page with screen icon 403. With an aspect of the embodiments, the software application generates screen icon 403 as the same icon selection as printed icon 402 (cross symbol as shown in FIGS. 3 and 4).

With an aspect of the embodiments, the software application determines area 450 (for example a circle having a predetermined radius) about screen icon 403. When the user moves digital device 201 into position, the software application will recognize the icon when it comes into proximity (for example, within area 450) to the center of the camera's view. At this time the software application is properly oriented and it uses visual capture technology to locate page indicium 401 within a specific proximity to printed icon 402.

After locating page indicium 401, the software application extracts the page number to access the appropriate digital content for the displayed page. FIG. 5 illustrates screen shot 501 of an exemplary digital content delivery in accordance with one or more embodiments. As will be discussed in greater detail, the digital content may be fetched from a data structure (for example, a database) by utilizing the extracted page number. While screen shot 501 is shown while computer device 201 is positioned over book 200, screen shot 501 may persist while computer device 201 is repositioned.

The above approach is typically more user-friendly and non-disruptive than traditional approaches of attempting to utilize digital technologies to expand the usefulness of a printed document. With traditional approaches, a printed document is often disrupted by the inclusion of unsightly and distracting encoded data, such as a series of dots, lines, or squares. This may lead to a less-than-ideal reading experience in the printed document and may limit the usefulness of the digital interaction to only the locations in the document that have those codes printed.

With an aspect of the embodiments, computer device 201 recognizes an existing sequential numbering scheme that printed documents already use, most notably page numbers (and in some possible future implementations of the method, chapter numbers and/or section identifiers).

In order to add value to a printed document, traditional approaches may rely on resource intensive and often cumbersome methods of scanning text on a page, converting it to computer-readable text through optical character recognition or some other similar methodology, and then attempting to identify both the document itself and the location in the document through complex searches of large online datasets. Consequently, traditional approaches are often very resource intensive and may require either stable Internet access or storage of a very large database of digital content at a digital device.

With an aspect of the embodiments, the approach does not rely on such resource-intensive processes because it relies solely on the identification of a page number in a defined print resource. Thus, digital content may be obtained with minimal processing and no internet connection.

Figure 6:
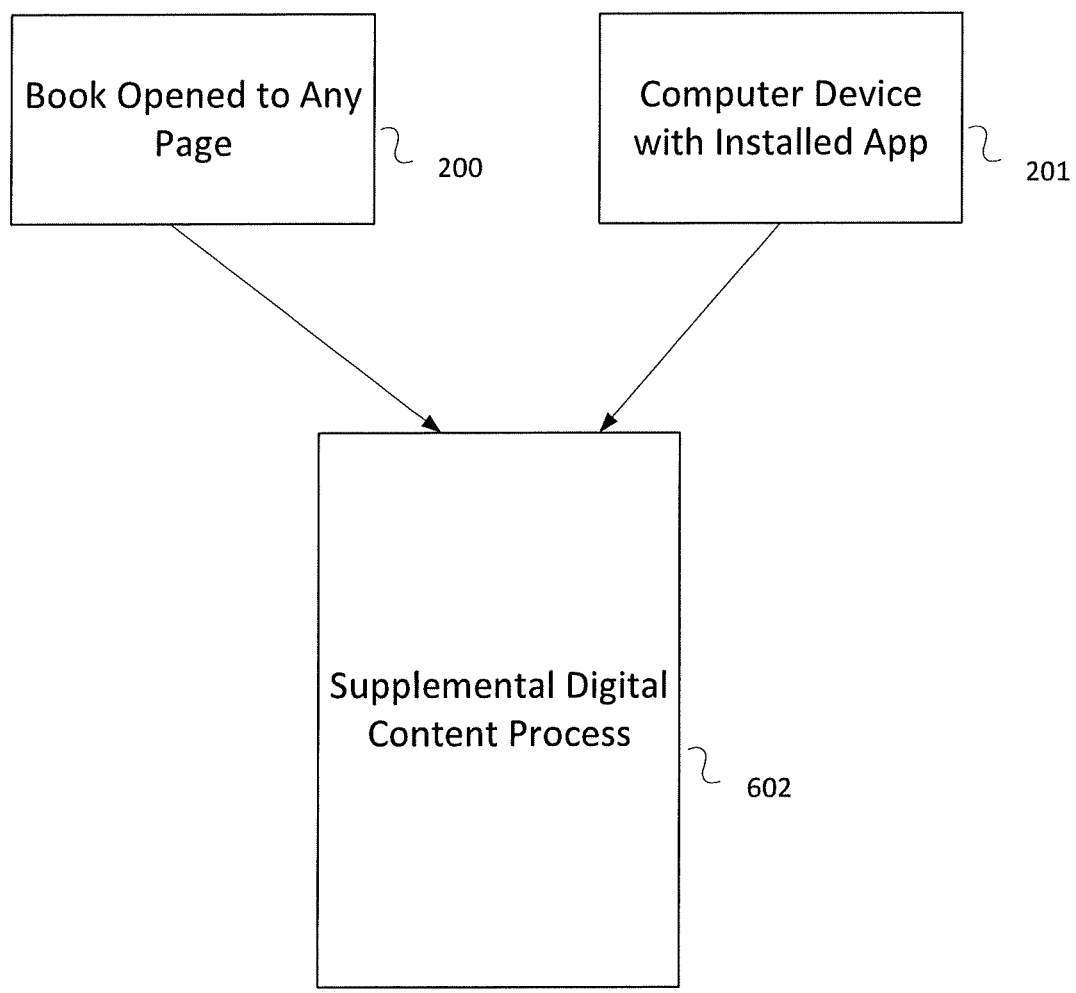
FIG. 6 depicts a process executing on a computer device that obtains visual information from a printed book in accordance with one or more example embodiments.

FIG. 6 depicts process 602 executing as a software application on computer device 201 that obtains visual information from printed book 200 in accordance with one or more example embodiments. There are two interconnected pieces of the user experience as employed by an approach: (1) printed document 200 (for example, a published book opened to any page) that contains a sequential numbering system for navigating through the document and locating specific locations, whether they be pages, sections, or some other means of identifying the location and (2) computer device 201 that includes a scanning device (for example, a camera) as well as installed computer-executable instructions that support process 602. For example, computer device 201 may comprise a smartphone or tablet computer with a proprietary app installed. With book 200 opened to any page, the user is able to read the book normally as the user wishes without any interruption from unsightly and distracting codes or icons. However, if the desires to have an extended experience on any page or section, the user is able to use computer device 201 by opening (launching) the relevant software application on computer device 201.

With traditional approaches, a user is often limited to being able to utilize a digital device for added value on pages and in locations that had specific, encoded information printed in those locations (for example, QR codes or matrices of dots that are machine readable). With an aspect of the embodiments, an extended digital experience is available on every single page of the printed document because every page has a page number or other sequentially-numbered location identifier.

FIG. 7 illustrates a flow chart for process 602 shown in accordance with one or more example embodiments.

At block 702, process 602 is launched so that the user can initiate a page scan through the particular interface of that application at block 703. With some embodiments, a user can do so by tapping a camera icon on the screen. At this time, a scanning interface is populated on the screen (for an example as shown in FIG. 3 from the original implementation). The user is then directed to align a special character near the page number or other sequentially-numbered location indicator on the page with the same icon as displayed on the screen of the device inside of a camera view at block 704.

When the user moves the computing device into position, the software application (supporting process 602) recognizes the printed icon when it comes into proximity to the center of the camera's view at block 705. At this time, the software application is properly oriented. The software application uses visual capture technology to locate the page number or other sequentially-numbered location indicator within a specific proximity to the icon at block 706. With some embodiments, the software application locates the page indicium at a specific distance above the printed icon.

The software application may use visual analysis technology to then scan, analyze, and convert visual data into machine readable numbers based on the page indicium at block 707.

At block 708, process 602 displays the extracted page number provided at block 707 along with an indicator for the user to confirm (or reject) the software application's analysis of the page number. This provides robustness for providing the correct page number so that intended digital content is presented for the opened page being read by the user.

At block 709, if the user indicates that the extracted page number from the scan is incorrect, process 602 reverts to block 703 in order to determine the correct page number in a subsequent attempt. If there are multiple bad scans, process 602 may prompt the user to manually input the page number or the content location. However, if the user indicates a successful identification of the page number, process 602 continues to block 711.

At block 711, the software application passes the extracted page number to a data structure (for example, a database) to identify the content present in the specified page/section of the printed document. (The identity of the content may be referred to as the content identification. For example, the content identification may identify the range of chapter and paragraph of a book or the Book.Chapter.Verse in the Bible spanned by the identified page number.) The database may be stored locally on computer device 201 that is executing the software application, or it may be accessed over the Internet, or a combination of the two data sources.

With the specific location in the printed document identified and the digital content that relates to the identified location in the printed document, process 602 queries another set of data to identify and retrieve digital content that amplifies, elucidates, explains, expands, or otherwise supplements the content of the printed document at block 712. The data may be organized with metadata that relates discrete units of digital content to all relevant locations in the printed document that is in view. The metadata that indicates it is contextually relevant to the content of the printed document is embedded in the digital content, identifying it as relevant to the content from the specific location in the printed document that the software application is retrieving information about. With some embodiments, discrete units of digital content are tagged with multiple specific Book Chapter:Verse ranges from the Bible that are relevant (for example, an article about the person of Moses may be tagged with a list of Book Chapter:Verse references in the metadata where that particular article is deemed relevant. The software application may retrieve and display the particular article in each of those locations, if and when a user scans the relevant location in their printed Bible). This approach allows valuable additional content to be made available throughout a printed document whenever it is relevant, and nowhere that it isn't relevant. The data sets that are queried at block 712 may be saved locally on the device being used, saved in specified locations on the Internet, or a combination thereof, where the data is curated and designated as relevant through the use of metadata.

Once the relevant digital content is identified at block 712, process 602 (the software application) organizes the digital content into multiple discrete outputs that are recognizable and relevant to the user at block 713. Printed documents may support multiple forms of information (for example, text, images, diagrams, and so forth), but digital devices and data may be far more versatile. Therefore, with an aspect of the embodiments, process 602 may identify discrete forms of output that are relevant for the particular location of the printed document in order to give users a clear and understandable experience with the information. For example with the New Living Translation of the Bible, as discussed above, digital content may be organized into two distinct textual outputs (one, designated "Study" which is primarily additional background information that expands and elucidates the textual content of the printed document; the other, designated "Reflect" which contains articles that aid readers in moving beyond the information on the page into relevant implications for their personal lives). In addition, a third output may be generated that organizes visual and interactive digital data. For example, with the New Living Translation of the Bible an output (designated "See") contains interactive maps, photos, illustrations, videos, and so forth.

The following example illustrates processing by computer device 201 at blocks 711-713.

With some embodiments, process 602 utilizes two related data structures in order to identify the content present at any particular location in the printed document at block 711 and identifying and retrieving relevant digital content for that particular location at block 712.

The first data structure relates the particular content of an individual page or section in the printed document. The printed document may be broken down into constituent parts that can be identified with an addressing scheme system, where any location within the document can be identified by providing the address of that location. For example, embodiments supporting the Protestant Bible may use the common divisions of Book.Chapter.Verse to identify the viewed portion of the document. With this addressing scheme for identifying particular locations in the printed document, the first data structure may relate the particular range of content (for example, Book.Chapter.Verse) that is spanned on a particular page and stores that information in a file that relates every individual page or identifiable section (using process 602 at blocks 703-710) to the particular content that is present in that range. For example, page 1417 may include the content identified as Ezekiel chapter 45, verse 10 through Ezekiel chapter 46, verse 12, where Ezekiel is the $26^{th}$ book in the Protestant Bible canon. Consequently, in the first data structure, there is an entry for page 1417 that identifies the content of that location (which may be referred to as the content identification) as 26.45.10-26.46.12 (where 26=Ezekiel; 45=chapter number; 10=verse number).

After block 711 has identified the content identification (26.45.10-26.46.12), process 602 at block 712 locates and identifies relevant digital content for the particular content present at that location of the printed document. Block 712 utilizes the second data structure, which relies on the same content identification schema as the first data structure (the Book.Chapter.Verse schema as described above). The second data structure uses that schema and relates one or more content identifications (content locations) to every individual piece of relevant digital content that has been gathered and identified as part of the particular set of data that relates to the printed document in view. For example, with some embodiments supporting in the Protestant Bible, different kinds of content are gathered that relate to the Bible in different ways. There are notes that explain the text in depth, which are categorized according to the specific verses they are commenting on. Those items are each tagged with the specific locations that they pertain to (in the above example, there is a note on Ezekiel 45:10-12 that is tagged with metadata to identify it as relevant to content location 26.45.10-26.45.12, for example). There are also profiles on individual people who show up throughout the Bible to provide more information about them as a person; this kind of content tends to have multiple (in some cases hundreds) of content locations where that particular digital content would be relevant to the printed document. (In the example above, there may be an article on Ezekiel the prophet tagged for this particular location along with 27 other locations throughout the Bible.) For some digital content that is not saved on computer device 201 as part of the software application (for example, videos that are available for streaming online), the content location schema may also be used to identify each piece of digital content that is relevant to a particular content location in the printed document. In these cases, an on-line connection may be required both to check for these digital content items as well as to view them. In either case (whether the digital content is saved on the device as a text file or located on the Internet in a specific location), the second data structure may be used to provide a list of relevant content locations.

With some embodiments, a piece of digital content may be are identified by the custom tag <ref> in a XML Extensible Markup Language file, where the digital content is relevant. Once the software application has completed block 711 and has identified the specific content locations that are in view in the particular location of the printed document that has been identified by the scan, it gathers every piece of content that has a <ref> tag that falls into the range identified. For example, every single piece of content that has a <ref> tag anywhere between 26.45.10 and 26.46.12 will be located in order to be displayed any time a user successfully scans page 1417 of the printed document.

While the above example is directed to a Protestant Bible, embodiments may be directed to other types of printed documents such a novels, magazines, textbooks, newspapers, and so forth, where the addressing scheme system is appropriate for the type of printed document. For example, with a textbook, the content identification may comprise a chapter number and a paragraph number.

Once this data is identified and gathered, the software application may display it for the user on the display device of computer device 201 at block 714 to extend their experience of the printed document through relevant, contextual digital content. With some embodiments, discrete output may be associated with different display windows that can be resized, minimized, maximized, and closed by the user.

Embodiments may be related to processing of visual and textual data within the software application. Unlike traditional approaches, the embodiments may connect physical, printed documents such as books to relevant digital content that extends the experience of the printed document, allowing access to interactive maps and imagery, videos, and even detailed textual background information that may not fit in a printed document without marring the page of the printed document with unsightly codes, and delivering an excellent reading experience with or without the supplementary digital content. In addition, embodiments may utilize a simple, intuitive, and non-resource intensive approach of connecting to the existing page or section location identifiers, rather than using resource-intensive or Internet-reliant approaches that attempt to identify a printed document through training computer device 201 to read the actual text of the document.

Figure 8:
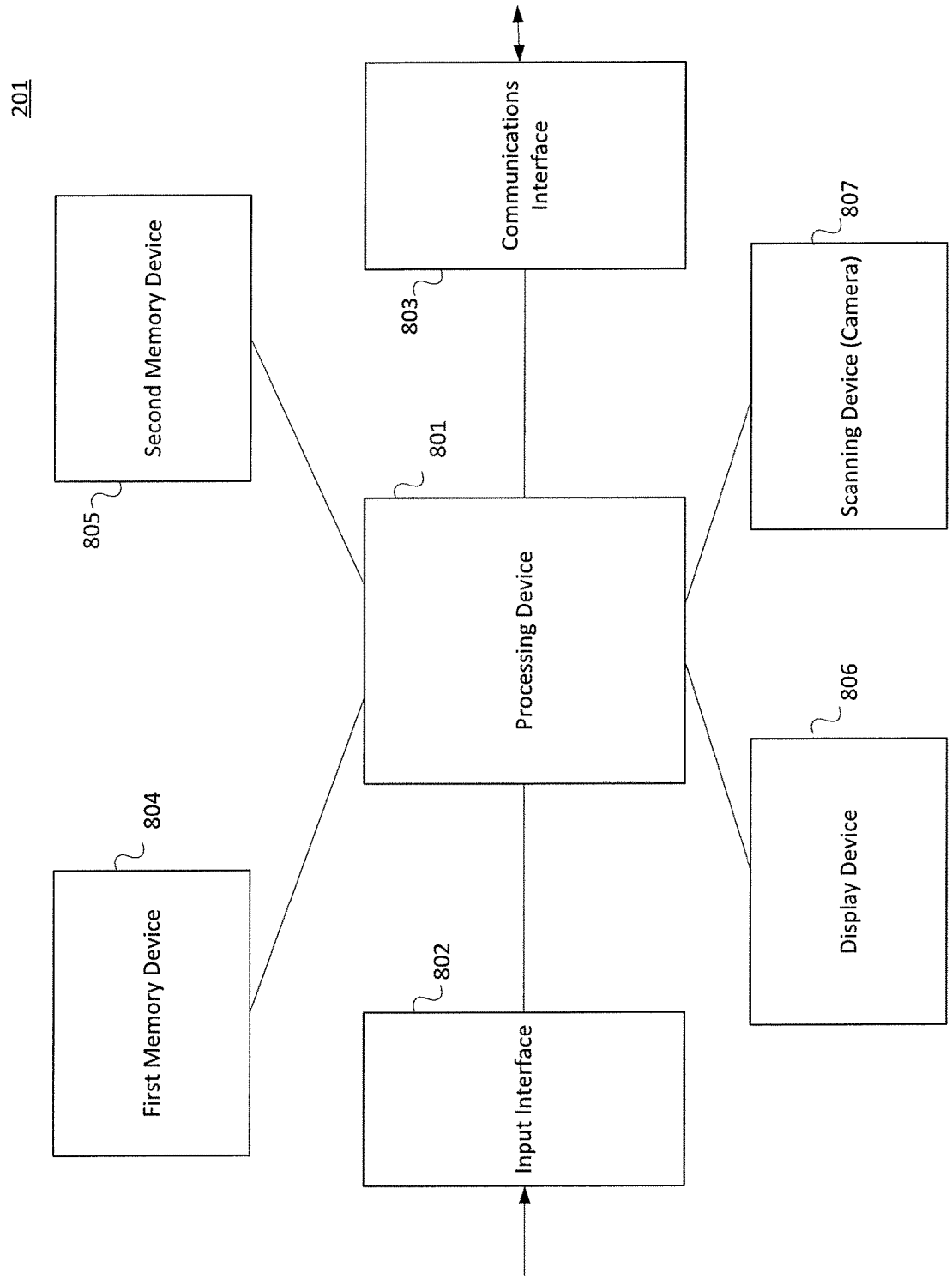
FIG. 8 illustrates a computing device that supports the process shown in FIG. 7 in accordance with one or more example embodiments.

FIG. 8 illustrates computing device 201 that supports process 602 shown in FIG. 7 in accordance with one or more example embodiments.

Computer device 201 includes processing device 801 for controlling overall operation of computer device 201 and its associated components, including memory devices 804 and 805, input interface 802, communications interface 803, display device 806, and scanning device 807 (for example, comprising a camera).

Computer device 201 obtains a visual image of printed document 200 through scanning device 807, which may comprise a camera and process the visual image by executing process 602 as previously discussed.

Computer device 201 may display all or a portion of the visual image and/or digital content on display device 806. For example, as shown in FIGS. 3-4, computer device 201 displays a portion of printed document 200 as well as printed icon 402 and screen icon 403 during the alignment procedure in order to detect page indicium 401. Also, as shown in FIG. 5, computer device 201 displays digital content through screen shot 501.

Computer device 201 may also obtain input data through input interface 802. For example, computer device 201 may receive an indication from a user via a touchpad or keyboard whether the displayed page number is correct at block 709 as shown in FIG. 7.

Computer device 201 may also obtain digital content from an external source (for example, via the Internet) through communications interface 803.

Computer device 201 may support one or more memory devices, for example, memory device 804 and memory device 805. With some embodiments, processor 801 may execute computer-executable instructions stored at memory device 804 and obtain data from one or more data structures stored at memory device 805.

Computer device 201 typically includes a variety of computer readable media. Computer readable media may be any available media that may be accessed by processing device 801 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 801.

Computer-executable instructions may be stored within a memory device (not explicitly shown) and/or storage to provide instructions to a processor for enabling processing device 801 to perform various functions. For example, one or more memory devices may store computer-executable instructions used by processing device 801 to support process 602 (as shown in FIG. 7), an operating system, application programs, an associated database, and so forth. Alternatively, some or all of the computer executable instructions for computing device 801 may be embodied in hardware or firmware (not explicitly shown).

Embodiments of the invention may include forms of computer-readable media. Computer-readable media include any available media that can be accessed by a processing device 801. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps (blocks) of a method in accordance with aspects of the invention is contemplated. For example, aspects of the method steps disclosed herein may be executed on processing device 801 on communication computing device 201.

Computing device 201 may operate in a networked environment supporting connections to one or more remote computers, such as terminals. The terminals may be personal computers or servers that include any or all of the elements described above with respect to the computing device. The network connections include a local area network (LAN) and a wide area network (WAN), but may also include other networks. When used in a LAN networking environment, the computing device may be connected to the LAN through a network interface or adapter. When used in a WAN networking environment, communication computing device 300 may include a modem or other network interface for establishing communications over the WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device and/or terminals may also be mobile terminals (for example, mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Another illustrative system for implementing methods according to the present disclosure may be used. The system may include one or more workstations. The workstations may be used by, for example, agents or other employees of an institution (for example, a financial institution) and/or customers of the institution. Workstations may be local or remote, and are connected by one or more communications links to computer network that is linked via communications links to the server. In the system, the server may be any suitable server, processor, computer, or data processing device, or combination of the same.

A computer network may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links may be any communications links suitable for communicating between the workstations and the server, such as network links, dial-up links, wireless links, hard-wired links, and the like.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method for obtaining digital content associated with printed content of a document by a computer device, the method comprising:
    capturing, through a scanning device, a visual image of the printed content, wherein the visual image includes a page indicium and a printed icon;
    generating, by the computer device, a screen icon on a display device of the computer device;
    detecting when a screen icon aligns with the printed icon;
    in response to the detecting, locating the page indicium, wherein the page indicium is located at a predetermined position relative to the printed icon;
    translating the page indicium to a page number, wherein the page number has a format readable by the computer device;
    when the screen icon aligns with the printed icon, displaying the page number along with an indicator;
    receiving a user input, via the indicator, confirming or rejecting that the page number is correct;
    when the user input via the indicator confirms the page number, accessing, from at least one data structure, digital content associated with the printed content at the page number;
    when the user input via the indicator rejects the page number, in subsequent attempts, prompting the user to manually input the page number; and
    displaying, on the display device, the digital content associated with the printed content.

2. The method of claim 1, wherein the printed icon comprises a unique character and the method further comprising:
    identifying, from the unique character, the document from a plurality of documents.

3. The method of claim 2 further comprising:
    transforming the screen icon to match the unique character of the printed icon.

4. The method of claim 1, wherein the accessing further comprises:
    obtaining a content identification based on the page number; and
    identifying at least one discrete unit of digital content based on the content identification.

5. The method of claim 4, wherein the at least one unit of discrete digital content comprises a first discrete unit and a second discrete unit of digital content, the method further comprising:
    organizing the first and second discrete units of digital content into a plurality of discrete outputs; and
    displaying the plurality of discrete outputs on the display device.

6. The method of claim 5, further comprising:
    displaying the plurality of discrete outputs in a plurality of display windows, wherein the first discrete unit of digital content is contained within a first display window and the second discrete unit of digital content is contained with a second display window.

7. The method of claim 5, wherein the at least one data structure comprises a first data structure and a second data structure, further comprising:
    obtaining the content identification from the first data structure; and
    retrieving the first and second discrete units of digital content from the second data structure.

8. The method of claim 7, further comprising:
    embedding metadata within the first and second discrete units of digital content, wherein the metadata is indicative of a relevancy of the first and second discrete units to the printed page at the page number.

9. The method of claim 7, wherein the second data structure is supported at a memory device of the computer device.

10. The method of claim 7, wherein the second data structure is supported at an external computing device.

11. The method of claim 1, wherein the detecting comprises:
    determining a region around the screen icon;
    detecting when the printed icon is within the region; and
    capturing the visual image when the printed icon is within the region.

12. The method of claim 11, wherein the detecting comprises:

extracting the page indicium from the captured visual image.

13. The method of claim 1 further comprising:
receiving a scan input, wherein the scan input is indicative whether a scan attempt was successful; and
when the scan input is indicative that the scan attempt was not successful, repeating the capturing, the detecting, and the locating.

14. One or more non-transitory computer-readable media storing computer-readable instructions that, when executed by a computer device, cause the computer device to:
capture, through a scanning device, a visual image of printed content, wherein the visual image includes a page indicium and a printed icon;
generate, by the computer device, a screen icon on a display device of the computer device;
detect when a screen icon aligns with the printed icon;
in response to the detecting, locate the page indicium, wherein the page indicium is located at a predetermined position relative to the printed icon;
translate the page indicium to a page number, wherein the page number has a format readable by the computer device;
when the screen icon aligns with the printed icon, display the page number along with an indicator;
receive a user input, via the indicator, confirm or reject that the page number is correct;
when the user input via the indicator confirms the page number, access, from at least one data structure, digital content associated with the printed content at the page number;
when the user input via the indicator rejects the page number, in subsequent attempts, prompt the user to manually input the page number; and
display, on the display device, the digital content associated with the printed content.

15. The one or more non-transitory computer-readable media of claim 14 storing computer-readable instructions that, when executed by a computer device, further cause the computer device to:
obtain a content identification based on the page number; and
identify at least one discrete unit of digital content based on the content identification.

16. The one or more non-transitory computer-readable media of claim 15 storing computer-readable instructions that, when executed by a computer device, further cause the computer device to:
organize first and second discrete units of digital content into a plurality of discrete outputs, wherein the at least one discrete unit of digital content comprises the first and second discrete units of digital content; and
display the plurality of discrete outputs in a plurality of display windows, wherein the first discrete unit of digital content is contained within a first display window and the second discrete unit of digital content is contained with a second display window.

17. A computer device, comprising:
at least one processor;
at least one memory device supporting at least one data structure;
a scanning device interface communicatively coupled to the at least one processor;
a display device; and
the at least one memory device storing computer-readable instructions that, when executed by the at least one processor, cause the computer device to:
capture, through the scanning device interface, a visual image of printed content, wherein the visual image includes a page indicium and a printed icon;
generate a screen icon on the display device of the computer device;
detect when a screen icon aligns with the printed icon;
in response to the detecting, locate the page indicium, wherein the page indicium is located at a predetermined position relative to the printed icon;
translate the page indicium to a page number, wherein the page number has a format readable by the computer device;
when the screen icon aligns with the printed icon, display the page number along with an indicator;
receive a user input, via the indicator, confirm or reject that the page number is correct;
when the user input via the indicator confirms the page number, access, from at least one data structure, digital content associated with the printed content at the page number;
when the user input via the indicator rejects the page number, in subsequent attempts, prompt the user to manually input the page number; and
display, on the display device, the digital content associated with the printed content.

18. The computer device of claim 17, wherein the at least one memory device storing computer-readable instructions that, when executed by the at least one processor, further cause the computer device to:
obtain a content identification based on the page number;
identify first and second discrete unit of digital contents based on the content identification;
organize the first and second discrete units of digital content into a plurality of discrete outputs; and
display the plurality of discrete outputs on the display device.

19. The computer device of claim 18, wherein the at least one memory structure comprises a first data structure and a second data structure and wherein the at least one memory device storing computer-readable instructions that, when executed by the at least one processor, further cause the computer device to:
obtain the content identification from the first data structure; and
retrieve the first and second discrete units of digital content from the second data structure.

20. The computer device of claim 18, wherein the at least one memory device storing computer-readable instructions that, when executed by the at least one processor, further cause the computer device to:
embed metadata within the first and second discrete units of digital content, wherein the metadata is indicative of a relevancy of the first and second discrete units to the printed page at the page number.

* * * * *